United States Patent [19]

Todoroki et al.

[11] 4,208,261

[45] Jun. 17, 1980

[54] CONTINUOUS METHOD FOR CATHODIC ELECTRODEPOSITION

[75] Inventors: Nobuaki Todoroki, Warabi; Junichi Yasukawa, Chigasaki, both of Japan

[73] Assignee: Shinto Paint Co., Ltd., Amagasaki, Japan

[21] Appl. No.: 911,950

[22] Filed: Jun. 2, 1978

[51] Int. Cl.$^2$ .................... C25D 13/06; C25D 13/22
[52] U.S. Cl. ................................................ 204/181 C
[58] Field of Search ................................. 204/181 C

[56] References Cited

U.S. PATENT DOCUMENTS 3,869,366  3/1975  Suzuki et al. .................. 204/181 C Primary Examiner—Howard S. Williams
Attorney, Agent, or Firm—Armstrong, Nikaido, Marmelstein & Kubovcik

[57]  ABSTRACT

An improvement in a method for coating an electrically conductive article by electrodeposition, wherein the article, as the cathode, is immersed in an aqueous bath containing a basic resin, at least partially neutralized with an acid compound, and a particulate synthetic resin, is provided. The improvement is the conducting of the electrodeposition continuously while adding a replenishing supply liquid to the aqueous bath to maintain a constant bath composition. The composition of the replenishing supply liquid is such that (a) the proportion of water is smaller than in the initial aqueous bath, (b) the proportion of the basic resin to the acid compound is larger than employed in the initial partial neutralization, and (c) the particulate synthetic resin is also present.

4 Claims, No Drawings

CONTINUOUS METHOD FOR CATHODIC ELECTRODEPOSITION

BACKGROUND OF THE INVENTION

This invention relates to a continuous method for coating an electrically conductive article. More particularly this invention is an improvement of a method for coating an electrically conductive article by electrodeposition wherein the article to be coated is used as a cathode and is coated by electrodeposition in an aqueous bath containing a basic resin at least partially neutralized with an acid compound and a synthetic resin in the form of fine powder.

There is known (U.S. Pat. No. 3,869,366 dated Mar. 4, 1975) a method for coating an electrically conductive article with a resinous material by electrodeposition which comprising immersing said article as the cathode in an aqueous bath containing, as essential components, (1) a water thinnable cationic binder resin which is a nitrogen atom-containing resin neutralized at least partially with an acid compound and (2) at least one non-ionic resin in the form of powder which is solid at the room temperature but can melt when heated to form a film, and applying a voltage between said cathode and an anticorrosive electrical conductor as an anode through said bath, so that said cationic binder resin and non-ionic resin powder are deposited on the surface of the article, the amount of the non-ionic resin being 100–5000 parts by weight per 100 parts of the binder resin, and the solid content in the aqueous bath being 10–20% by weight.

Such cationic electrodeposition system wherein a cationic binder resin is used is advantageous as compared with other conventional electrodeposition coating methods, for example, as follows:

(1) The Coulomb efficiency is higher. Therefore, the amount of consumption of electricity per unit amount of resin deposition is small.

(2) The amount of resin deposition time is large so that a coating film with sufficient thickness can be obtained in a very short period of time. Therefore, the production efficiency can be remarkably increased.

(3) The film thickness of about 100 microns or larger can be obtained. Since the film thickness is considerably larger than in a conventional method, the hurt concealability of the base of the article to be coated is high, and the feel, luster and properties of the coating film are excellent.

(4) Coating film properties as excellent as of a coating film by a conventional powder painting method will be able to be obtained.

In carrying out such cationic-type electrodeposition, the amount of the non-ionic synthetic resin powder to be dispersed in the aqueous bath is 100–5000 parts, preferably 100–1000 parts by weight per 100 parts of the cationic binder resin in the bath, and the solid content in the aqueous bath is 10–20% by weight. The bath is maintained at 20°–30° C. and a voltage is applied between the cathode (article to be coated) and anode to cause direct current flow through said bath for about 5–30 seconds. The voltage to be applied is generally about 100–600 V. The pH of the bath is 4.0–6.0.

For more details about the electrodeposition process wherein the cationic binder resin is used, reference may be made to U.S. Pat. No. 3,869,366. The present invention is directed to an improvement of such cationic type electrodeposition process.

Thus when such cationic type electrodeposition coating is carried out continuously, the respective components in the bath will not decrease at the same rate so that there is caused fluctuation in the bath composition. For example, with the progress of the electrodeposition, the basic resin (binder resin) and fine synthetic non-ionic resin powder will be consumed but the acid compound used to render the basic resin water-thinnable to prepare the binder resin will remain in the bath and will occupy a relatively larger proportion in the bath. Under such state, when a replenishing supply liquid having the same composition as that of the initial bath is added, the proportion of the acid compound relative to the basic resin in the bath will continuously increase and the concentration of the acid in the bath will accordingly be increased. Under such condition, the following disadvantages will be incurred.

(A) The precoated film (formed by the pretreatment) on the article will be damaged or the article will be rusted, so that the properties of the final coating film will be adversely affected.

(B) Gas will be abnormally generated by the electrolysis at the time of the electrodeposition and as a result thereof many gas pores will be formed in the wet coating film, so that pinholes will tend to be formed when the film is baked and the uniformity of the coating film will be impaired.

(C) At the time of the electrodeposition, there will be caused difference in the electrophoretic rate between the cationic synthetic resin and the fine synthetic non-ionic resin powder. In some cases, the electrophoretic rate of the fine synthetic resin powder will be lowered so that the cationic resin will be contained more in the deposited coating film. In such case the coating film will lose the excellent properties owned by the fine synthetic resin powder, impairing the desired properties of the film. In some other cases, on the contrary, the content of the fine synthetic resin powder will become undesirably higher in the coating film.

(D) The electric current flowing at the time of the electrodeposition will become large and the rate of the ineffective current will increase so that the above described high coulomb efficiency will be lost.

Therefore, an object of the present invention is to provide a method wherein the above described disadvantages during the continuous long time operation of the cationic type electrodeposition coating method are overcome and the balance of the components in the electrodeposition bath is properly maintained.

Other objects of the invention will be apparent from the following description.

SUMMARY OF THE INVENTION

Thus the present invention is to improve a method for coating an electrically conductive article with a resinous material by electrodeposition which comprising immersing said article as the cathode in an aqueous bath containing, as essential components, (1) a water thinnable cationic binder resin which is a nitrogen atom-containing basic resin neutralized at least partially with an acid compound and (2) at least one non-ionic resin in the form of powder which is solid at the room temperature but can melt when heated to form a film, and applying a voltage between said cathode and an anticorrosive electrical conductor as an anode through said bath, so that said cationic binder resin and non-ionic resin powder are deposited on the surface of the article, the amount of the non-ionic resin being 100-5000 parts by weight per 100 parts of the binder resin, and the solid content in the aqueous bath being 10-20% by weight. The improvement according to this invention is to maintain the composition of the bath as constant as possible even when the electrodeposition is conducted continuously. This is accomplished, according to this invention, by adding to the bath a replenishing supply liquid wherein (A) the proportion of water is made smaller than in the initial aqueous bath, (B) the proportion of the nitrogen atom-containing basic resin relative to the acid compound is made larger than that used at the time of the initial partial neutralization and (C) there is also contained the non-ionic resin powder.

DESCRIPTION OF THE PREFERRED EMBODIMENTS

As explained before, when the above mentioned cationic type electrodeposition is continuously carried out, the acid compound will be accumulated in the bath and the acid concentration will gradually increase. Accordingly, the relative amount of the basic resin remaining in the bath will decrease and the neutralization degree of the cationic synthetic resin will become higher. Generally, under the ordinary electrodepositing conditions, the neutralization degree of the cationic synthetic resin to be used is about 50% to about 70% (i.e. equivalent ratio of amino groups in the cationic resin/acid compound being 1/0.5 to 0.7), preferably about 60%. However, as the electrodeposition proceeds the neutralization degree will be increased to exceed 70% and such disadvantages as explained before will occur. In this connection we have found that it is necessary to reduce the neutralization degree of the cationic synthetic resin formed as a whole down to the initial predetermined value by adding the basic resin into the bath, when the value has become so larger than the initial neutralization degree, for example when the neutralization degree has increased to 70 to 75%. The amount of the basic resin to be added therefor may be theoretically such that will produce a cationic synthetic resin of the initial neutralization degree by neutralizing the acid compound which has become excessive in the bath. However, with the progress of the electrodeposition, the basic resin itself will be also consumed. Therefore, it is also necessary to supplement the consumed resin as a cationic synthetic resin of the initial neutralization degree. Therefore, it is necessary to supply both the amount of the basic resin for the neutralization of the by-formed acid and the amount of the basic synthetic resin consumed due to the electrodeposition. For this purpose, it is necessary to prepare in advance a cationic synthetic resin of a low neutralization degree, for example, of 45% and to add the same to the bath. Thus there is added a replenishing supply liquid in which the ratio of the basic resin to the acid compound is made larger than that used for the preparation of the initial cationic synthetic resin.

Further, with the progress of the electrodeposition, the fine non-ionic synthetic resin powder will be also consumed and will therefore also have to be replenished. The amounts of this fine synthetic resin powder and the above mentioned basic resin of the low neutralization degree are added so as to keep the content of the solid in the bath approximately constant, i.e. 10 to 20% by weight. Further, it is preferable that the weight ratio of non-ionic synthetic resin:binder resin in the replenishing supply liquid is 100/100-1000/100.

Also, with the progress of the electrodeposition, a certain amount of water in the bath will also be deposited on the article to be coated or will be more or less decreased by evaporation or the like. However, the consumption of water is very small as compared with the rate of consumption of the solid in the bath. Therefore, it is preferable to make the concentration of the solid in the replenishing supply liquid as high as possible (preferably 30-70%). Even when such high solid concentration supply solution is added the total volume of the bath may sometimes become larger than the initial bath volume. In such case, it is preferable to keep the volume of the bath as constant as possible by taking out a part of the bath liquid having fluctuated in the composition before, during or after adding the replenishing liquid in response to the composition and amount of the replenishing liquid during the progress of the electrodeposition. The bath liquid thus partly taken out may be separately subjected to the regeneration to the initial bath liquid or replenishing supply liquid.

According to this invention, by adding such replenishing supply liquid to the electrodeposition bath during the continuous electrodeposition process, the composition of the electrodeposition bath is maintained substantially constant, and consequently the stability of the bath and uniformity of the coating film can be attained.

Examples of the basic resins containing nitrogen atoms in the molecule are amino group-added epoxy resins (aminoepoxy resins), amino group-containing acrylate (amino-acryl resins), amino group-containing vinyl compound copolymers (aminovinyl resins) and polyamide resins.

The aminoepoxy resins may be obtained by adding an organic amino compound to an epoxy group in an epoxy resin or epoxy modified resin. A glycidyl ether of phenol or a glycidyl ether of a phenol-aldehyde condensate is suitable as such epoxy compound. Among commercial products thereof are Epikole 828, Epikote 1001, Epikote 1002, Epikote 1004, Epikote 1007 and Epikote 1009 (trade marks) produced by Shell Oil Co., Araldite 6071, Araldite 6084, Araldite 6097, Araldite 6099 and Araldite 7072 (trade marks) produced by Ciba Ltd. and Epichlon 800, Epichlon 1000 and Epichlon 1010 (trade marks) produced by Dainippon Ink Co. Polyalkadiene epoxide such as polybutadiene epoxide can also be used. Further, a copolymer of unsaturated compound containing an epoxy group such as glycidyl methacrylate, glycidyl acrylate, N-glycidylacrylamide, allylglycidylether or N-glycidylmethacrylamide with another unsaturated monomer copolymerizable therewith is also useful. As an organic amino compound to be added to such epoxy group, a secondary monoamine is most preferable. However, a primary monoamine or polyvalent amine can also be used together with such secondary monoamine. Examples of these amino compounds are diethylamine, diethanolamine, diisopropylamine, dibutylamine, diamylamine, diisopropanolamine, ethylaminoethanol, ethylaminoisopropanol, n-butylamine, ethanolamine, ethylenediamine and diethylenetriamine.

The aminoacryl resins or aminovinyl resins are basic resins obtained by copolymerizing an acrylate or methacrylate having an amino group or a nitrogen-containing acrylic or vinyl compound such as vinyl pyridine or vinylimidazole with a vinyl compound having no free acid group. Example of such acrylic acid esters having amino groups are esters of acrylic acids or methacrylic acids and amino alcohols, such as aminoethyl acrylate, aminobutyl acrylate, methylaminoethyl acrylate, dimethylaminoethyl acrylate, hydroxyethylaminoethyl acrylate, aminoethyl methacrylate and dimethylaminoethyl methacrylate. Examples of vinyl compounds having no free acid group and to be copolymerized with the above amino- or nitrogen-containing compounds are acrylic acid and methacrylic acid derivatives such as methyl acrylate, ethyl acrylate, butyl acrylate, 2-ethylhexyl acrylate, acrylamide, N-methylolacrylamide, N-butoxymethylacrylamide, acrylonitrile, methyl methacrylate, ethyl methacrylate, n-butyl methacrylate, isobutyl methacrylate, 2-hydroxyethyl methacrylate, glycidyl methacrylate and methacrylamide, etc., aromatic vinyl compounds such as styrene, α-methyl styrene, vinyl toluene, etc. and other vinyl compounds such as vinyl acetate, vinyl chloride and vinyl isobutyl ether.

The polyamide resins are condensates of a dibasic acid and a polyvalent amine. Examples of dibasic acids are isophthalic acid, adipic acid and dimer acids, and examples of polyvalent amines are ethylene diamine and diethylene triamine.

Examples of acid compounds to be used for the reaction with the basic resin containing nitrogen atoms are hydrochloric acid, phosphoric acid, formic acid, acetic acid, propionic acid, lactic acid, citric acid, nalic acid, tartaric and acrylic acid, but any other inorganic acids and organic acids may also be used. These acids may be used alone or as a mixture of two or more.

A water-dilutable or thinnable cationic binder resin may be obtained by adding to the basic resin 0.2 to 3 equivalents, preferably 0.5 to 1.5 equivalents of the acid compound to the amino groups or basic nitrogen atoms in the basic resin and well agitating the mixture at the normal or room temperature.

The non-ionic synthetic resins in the form of powder and to be used together with cationic binder resin are those which are solid at the normal or room temperature and can melt when heated in the subsequent baking operation, and may or may not be compatible with the binder resin in the fused film formed at an elevated temperature. The non-ionic synthetic resin should be used in the form of fine powder with an average particle size of 0.5 to 100 microns. Further, the non-ionic resin may be thermosetting by itself or thermoplastic but, preferably, is curable with a curing agent or catalyst which is known per se in the art.

The non-ionic synthetic resin may be selected from the group consisting of epoxy-resins, polyester resins, acrylic resins, etc.

The epoxy resin is a glycidyl etheride of phenol, a glycidyl etheride of a phenol aldehyde condensate or a phenol glycidyl etheride esterified with 10 to 20% dimer acid. As for the polyester resin there may be used a blend of a melamine resin with a saturated linear polyester or an oil-free alkyd resin.

The acrylic resin is a polymer or copolymer of an acrylate or methacrylate or its copolymer with any other copolymerizable unsaturated monomer. For example, it is a copolymer of an acrylate and styrene, or a copolymer consisting of a methacrylate and unsaturated carboxylic acid. Such acrylic resin may be mixed with a cross-linking agent or curing catalyst such as blocked isocyanate, amino resin, epoxy resin, etc.

The blocked isocyanate is selected from those which can cure the above mentioned fine synthetic non-ionic resin powder by being decomposed at 140° to 250° C. when heated. The polyisocyanates for forming the blocked isocyanates are tolylene diisocyanate (TDI), hexamethylene diisocyanate (HDI), xylene diisocyanate (XDI), isophorone diisocyanate (IPDI) and prepolymers thereof. The blocking agents for forming the blocked isocyanates are phenols, alcohols and lactams. Among the blocked isocyanates is particularly preferable such polyisocyanate as hexamethylene diisocyanate or isophorone diisocyanate blocked with ε-caprolactam.

One or more of these curing agents are mixed with the non-ionic synthetic resin which contains hydroxyl groups in such proportion that NCO:OH ratio is 1:1 and the mixture is melted and kneaded below 140° C. at which no cross-linking reaction occurs and is then crushed to be a fine powder.

Two or more of the above mentioned powdery non-ionic resins may be used as a mixture.

The particle size of the resin powder is that obtained by an ordinary mechanical crushing method or chemican method but influences the dispersibility of the powder in the electrodeposition bath, the electric resistance value of the coating film at the time of the electrodeposition and the appearance of the coating film and is therefore varied depending upon the particular purpose. For example, in case a thick film is required, the particle size (diameter) will be below 100 microns, while when a coating film with high electric resistance is desired, particle size of less than 50 microns will be preferable.

The above explained basic resins, cationic binder resins and non-ionic synthetic resins are all well known in the art and mostly commercially available, and therefore no further explanation thereabout will be necessary.

In any case, it will be understood that these resins in the state as used in the electrodeposition bath are in the form of prepolymers or precondensates which are curable by themselves or in the presence of a cross-linking agent or catalyst upon the subsequent heat treatment or baking to form a rigid or tough film.

If desired a mixture of two or more different cationic binder resins, and/or two or more different non-ionic synthetic resins.

The amount of the non-ionic synthetic resin powder to be dispersed in the aqueous bath is 100–5000 parts, preferably 100–1000 parts by weight per 100 parts of the cationic binder resin in the bath.

If desired the bath may also contain pigment which is used in usual paints. The amount of such pigment may be 0 to 30 parts by weight per 100 parts of the total resin (cationic binder resin and non-ionic resin) in the bath.

The bath may also contain a small amount of a curing agent for the resin(s), flow-adjusting agent and other additives which are usually used in the art of synthetic resin type paints.

Further the bath may also contain a small amount (i.e. 0–100 parts by weight per 100 parts of the binder resin) of an organic solvent. The organic solvent is useful to increase the adhesiveness of the binder resin, to improve the appearance of the coating film and to improve the stability of the paint. Preferably the organic solvent is a good solvent for the binder resin but is substantially non-solvent for the powdery non-ionic resin, such as alcoholic solvent, e.g. methanol, ethanol, isopropanol, n-butanol, diacetone alcohol, methoxy ethanol, ethoxy ethanol, isopropoxy ethanol, butoxy ethanol, ethylene glycol or propylene glycol.

In the present invention, when the electrodeposition is continuously carried out, with the lapse of time, microorganisms will grow in the bath and as a result thereof the fine synthetic resin powder will cohere to deteriorate the stability of the bath and the appearance of the coating film will be impaired. In order to prevent the growth of such microorganism, an alkane polythiocyanate of 1 to 3 carbon atoms can be added into the bath. It is preferable to dissolve a proper amount of such alkane polythiocyanate in one or a mixture of two or more of proper solvents such as alcohols, ketones, dioxane, dimethylformamide, dimethyl sulfoxide, cellosolve and aromatic hydrocarbons, and a surface active agent if desired, and the resulting solution is added to the bath. Examples of the alkane polythiocyanates of 1 to 3 carbon atoms are methane dithiocyanate, ethane 1,2-dithiocyanate and propane 1,2,3-trithiocyanate. Particularly methane dithiocyanate is preferable. The amount of addition of such alkane polycyanate may vary depending on the degree of the growth of the microorganisms. However, generally it is preferable to add the same in an amount of 2 to 500 ppm. based on the total amount of the bath liquid. More preferable amount is 10 to 200 ppm.

The aqueous paint to be used for the electrodeposition may be prepared through premixing, dispersing and letting-down steps by adding a powdery resin and, as required, a pigment and additive to a cationic binder resin solution diluted with water or an organic solvent, in the same manner as in the production of an ordinary paint.

The electrodeposition is conducted until a coating film of a desired thickness is deposited on the cathodic article. As explained hereinbefore a thicker (than in conventional electrodeposition process) film can be deposited on the article. Preferably the thickness is 60-100 microns, but if desired a thickness up to about 130 microns or more can be attained.

In the aqueous bath each of the non-ionic resin particles and pigment articles if any adsorb the cationic binder resin and therefore when an electric current is passed through the bath these particles together with the cationic resin will migrate toward and will be deposited on the cathodic article. This phenomenon is same as in the conventional anionic electrodeposition process except that the deposition occurs on the cathode rather than anode. The cationic binder resin further serves to fill the voids or spaces between the deposited particles to elevate the electric resistance of the deposited film and also to increase the throwing power of the film. Further the cationic binder resin will serve to improve adhesion between the surface of the cathodic article and the film deposited thereon. Of course the cationic resin will constitute a part of the coated film.

After the electrodeposition the resin-coated article is taken out of the bath and washed with water and then heated or baked for melting and/or curing the resinous layer to form a tough film in a conventional manner. Preferably the coated article is preheated at a temperature of 50°-100° C. for a few minutes or up to about 5 minutes and then baked at 150°-250° C. for 15-30 minutes.

According to this invention, as explained before, the above mentioned electrodeposition is conducted continously and during the continuous electrodeposition a particular replenishing supply liquid is added to the bath continuously or intermittently to maintain the bath composition as constant as possible.

The invention will be further explained by referring to the following examples wherein all parts are by weight.

EXAMPLES (I) Production of water-dilutable cationic binder resin

| | |
|---|---|
| (1) Epoxy resin (EPU-3-70-I, product of Asahi Electrochemical Co.) : | 258.6 parts |
| (2) Epoxy resin (Epikote 1001, product of Shell Chemical Co.) : | 77.5 parts |
| (3) Isopropyl alcohol : | 33.3 parts |
| (4) Diethanolamine : | 41.5 parts |
| (5) Lactic acid (50%) : | 13.4 parts |
| (6) Propionic acid : | 12.8 parts |
| (7) Pure water : | 562.7 parts |

First of all, (1) to (4) were made to react under reflux at 85° to 90° C. for 4 hours to prepare a liquid aminoepoxy resin. The, (5) to (7) were added thereto to obtain a water-dilutable cationic binder resin liquid of 30% solid content and a neutralization degree of 60%.

(II) Preparation of non-ionic fine synthetic resin powder

| | |
|---|---|
| (1) Epoxy resin which is solid at the normal temperature (Epikote 1007, product of Shell Chemical Co.) : | 73 parts |
| (2) Epoxy resin which is solid at the normal temperature (Epikote 1004, product of Shell Chemical Co.) : | 217 parts |
| (3) Blocked isocyanate (No.118, product of Asahi Electrochemical Co.) : | 230 parts |
| (4) Titanium oxide (R-550, product of Ishihara Industrial Co.) : | 137 parts |
| (5) Carbon black (MA-100, product of Mitsubishi Chemical Co.) : | 3 parts |
| (6) Surface levelling agent (MIki-levelling, product of Kyoeisha Oil & Fat Chemical Co.) : | 7 parts |

(1) to (6) were melted together and kneaded in an extruder in an ordinary manner. The product was crushed with a crusher to obtain a fine epoxy resin powder.

(III) Preparation of electrodeposition bath 710 parts of deionized water were added to 355 parts of the water-dilutable cationic resin obtained in (I) and the mixture was well agitated with a dissolver to obtain a water-dilutable cationic resin liquid of 10% solid content.

This resin liquid of 10% solid content was gradually added to 373 parts of the fine epoxy resin powder obtained in (II). The mixture was agitated for about 30 minutes, and further 1762 parts of deionized water were added thereto and the mixture was diluted until the solid content became 15% to obtain an electrodeposition bath liquid. The thus obtained liquid was added with 20 ppm. of methane dithiocyanate. Thus obtained bath liquid is referred to as (A). The characteristics and electrodeposition characteristics of this bath liquid are shown in Table 1.

(IV) Electrodeposition coating

A zinc-treated test piece of 90×150×0.8 mm. was connected to a cathode and was subjected to electrodeposition by using the bath liquid (A) obtained in (III)

with an impressed voltage of 250 V at a bath temperature of 25° C. for 10 seconds.

When 50 test pieces were coated, the bath liquid characteristics and electrodeposition characteristics were measured. It was observed that as shown in Table 1, the concentration of the acid for the water-dilutable cationic resin in the bath was increased, the electrodeposition coating film thickness was reduced and the balance of the components in the bath was lost. This bath liquid is referred to as (B). Therefore, in order to adjust this bath (B) back to the normal or initial state, a replenishing supply liquid containing a water-dilutable cationic resin of a low neutralization degree was added thereto as follows.

(V) Preparation of replenishing supply liquid

| | |
|---|---|
| (1) Epoxy resin (EPU-3-70-I, product of Asahi Electrochemical Co.) : | 58.85 parts |
| (2) Epoxy resin (Epikote 1001, product of Shell Chemical Co.) : | 15.25 parts |
| (3) Isopropyl alcohol : | 6.52 parts |
| (4) Diethanolamine : | 8.16 parts |
| (5) Lactic acid (50%) : | 4.41 parts |
| (6) Propionic acid : | 0.78 parts |
| (7) Pure water : | 12.56 parts |

First of all, (1) to (4) were made to react under reflux at 85° to 90° C. for 4 hours to prepare a liquid aminoepoxy resin. Then (5) to (7) were added thereto to obtain a water-dilutable cationic resin of 60% solid content and a neutralization degree of 45%.

Then, 75.5 parts of this water-dilutable cationic resin as diluted to be of 30% solid content by gradually adding the unbalanced bath liquid (B) and 158 parts of the fine synthetic resin powder obtained in (II) as well wet by gradually adding 320 parts of the unbalanced bath liquid (B) were mixed together to obtain a replenishing supply liquid.

This replenishing supply liquid was mixed with the rest of the unbalanced bath liquid (B) and the mixture was diluted until the solid content became 15.9% by adding 266 parts of pure water and the mixture was agitated for about 1 hour to prepare a bath liquid (C).

The characteristics and electrodeposition characteristics of this bath liquid (C) are as shown in Table 1, from which it would be apparent that, by using this bath (C) there was obtained a coating film comparable with that obtained by the use of the initial bath (A).

What we claim is:

1. In a method for coating an electrically conductive article with a resinous material by electrodeposition comprising immersing said article as the cathode in an aqueous bath containing, as essential components, (1) a water thinnable cationic binder resin which is a nitrogen atom-containing resin neutralized partially with an acid compound and (2) at least one non-ionic resin in the form of powder which is solid at the room temperature but can melt when heated to form a film, and applying a voltage between said cathode and an anticorrosive electrical conductor as an anode through said bath, so that said cationic binder resin and non-ionic resin powder are deposited on the surface of the article, the amount of the non-ionic resin being 100–5000 parts by weight per 100 parts of the binder resin, and the solid content in the aqueous bath being 10–20% by weight; the improvement wherein the electrodeposition is conducted continuously and a replenishing supply liquid is added to the aqueous bath during the electrodeposition in order to maintain the composition of the bath as constant as possible, said replenishing supply liquid being such composition that (A) the proportion of water is made smaller than in the initial aqueous bath, (B) the proportion of the nitrogen atom-containing basic resin relative to the acid compound is made larger than that used at the time of the initial partial neutralization and (C) there is also contained the non-ionic resin powder; said replenishing liquid being added to the bath when the neutralization degree of the cationic binder resin in the bath has been raised so that said neutralization degree is increased at least about 10% beyond the neutralization degree of said cationic binder resin before voltage was applied between said cathode and said anticorrosive electrical conductor anode.

2. A method as claimed in claim 1 wherein the solid content in the replenishing supply liquid is 30–70% by weight.

3. A method as claimed in claim 1 wherein the amount of the non-ionic synthetic resin powder in the replenishing liquid is 100–1000 parts by weight per 100 parts of the binder resin.

4. A method as claimed in claim 1 wherein the non-ionic synthetic resin in the form of powder contains a blocked isocyanate which decomposes at 140°–250° C. when heated and which is capable of curing said synthetic resin.

* * * * *

Table 1

| Liquid characteristics and electrodeposition characteristics | Bath (A) | Bath (B) | Bath (C) |
|---|---|---|---|
| Solid content (%) | 15.0 | 11.6 | 15.9 |
| pH | 5.15 | 5.05 | 5.21 |
| Po/Bi* | 3.5/1 | 3.37/1 | 3.42/1 |
| Neutralization degree (%) | 60 | 72 | 62 |
| Electrodeposition condition | | 250 V × 10 seconds × 25° C. | |
| Film thickness (microns) | 63–65 | 49–51 | 62–67 |
| Coulomb efficiency (mg/C) | 82 | 68 | 79 |
| Baking conditions | 80° C. × 5 minutes | 13 minutes ⟶ 200° C. × 15 minutes | |
| Coating film appearance | Smooth and beautiful | Citrous skin and bad | Smooth and beautiful |

Note: *Po/Bi is a weight ratio of the fine non-ionic synthetic resin powder to the water-dilutable cationic binder resin in the electrodeposition bath liquid.